United States Patent
Kherani et al.

(10) Patent No.: US 10,162,990 B2
(45) Date of Patent: Dec. 25, 2018

(54) ANALOG HETEROGENEOUS CONNECTIVITY TAGS AND METHODS AND SYSTEMS TO CONFIGURE THE TAGS

(71) Applicant: Samsung Electronics Co., Ltd, Gyeonggi-do (KR)

(72) Inventors: Arzad Alam Kherani, Chhattisgarh (IN); Ashutosh Deepak Gore, Bangalore (IN); Anand Sudhakar Chiddarwar, Bangalore (IN); Ok-Seon Lee, Gyeonggi-do (KR); Sin-Seok Seo, Gyeonggi-do (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/582,582

(22) Filed: Apr. 28, 2017

(65) Prior Publication Data

US 2017/0316233 A1 Nov. 2, 2017

(30) Foreign Application Priority Data

Apr. 29, 2016 (IN) .............................. 201641014990

(51) Int. Cl.
| | |
|---|---|
| *H04B 7/00* | (2006.01) |
| *G06K 7/10* | (2006.01) |
| *H04W 4/021* | (2018.01) |
| *H04B 5/02* | (2006.01) |
| *H04B 5/00* | (2006.01) |
| *G06K 19/07* | (2006.01) |
| *H04W 88/06* | (2009.01) |

(52) U.S. Cl.
CPC ..... *G06K 7/10227* (2013.01); *G06K 19/0723* (2013.01); *H04B 5/0062* (2013.01); *H04B 5/02* (2013.01); *H04W 4/021* (2013.01); *H04W 88/06* (2013.01)

(58) Field of Classification Search
CPC .... G06K 7/10227; H04B 5/0062; H04B 5/02; H04W 4/021; H04W 88/06
USPC ...................................................... 455/41.2
See application file for complete search history.

(56) References Cited

U.S. PATENT DOCUMENTS

| | | | |
|---|---|---|---|
| 7,248,165 B2 | 7/2007 | Collins et al. | |
| 7,475,806 B1 | 1/2009 | Crossno et al. | |
| 7,742,775 B2 | 6/2010 | Myers | |
| 2011/0273273 A1 | 11/2011 | Liu | |
| 2011/0285511 A1 | 11/2011 | Maguire et al. | |
| 2012/0114050 A1* | 5/2012 | Osterling | H04B 7/024 375/259 |

(Continued)

*Primary Examiner* — Eugene Yun

(57) ABSTRACT

Analog heterogeneous tags and methods and systems to configure the tags are described. The present invention relates to the field of electronic devices and more particularly to electronic tag devices using analog technology. Embodiments herein disclose a tag that can work in at least one of transmit only, receive only or transmit/receive modes and can transmit/receive using a plurality of communication technologies without the complex stack functionality with minimal hardware and memory requirements, wherein the tag uses I/Q samples corresponding to each technology pre-stored on the tag. Embodiments herein also disclose methods and systems for configuring the electronic tags using a configuration device, wherein the configuration device provides the I/Q samples of each technology to the tag.

20 Claims, 20 Drawing Sheets

(56) References Cited

U.S. PATENT DOCUMENTS

2012/0313817 A1* 12/2012 Underbrink ............ G01S 19/37
                                                                         342/357.72

* cited by examiner

Cellular mode of TAG allows remote tracking of the carriage carrying it.
1) It can be easily integrated with an App providing other fleet info too.

Various transactions can be coordinated with TAGS from the APP

Tracking inventory analyzing product ship statistics in real time

ANALOG HETEROGENEOUS CONNECTIVITY TAGS AND METHODS AND SYSTEMS TO CONFIGURE THE TAGS

CROSS-REFERENCE TO RELATED APPLICATIONS AND CLAIM OF PRIORITY

The present application is related to and claims the benefit under 35 U.S.C. § 119(a) of an Indian Provisional Application No. 201641014990 filed on Apr. 29, 2016, and an Indian Complete Application No. 201641014990 filed on Jan. 3, 2017, the entire disclosures of each of which are incorporated herein by reference.

TECHNICAL FIELD

The present invention relates to the field of electronic devices and more particularly to electronic tag devices using analog technology.

BACKGROUND

Tag devices (hereinafter referred to as tags) are used for positioning, tracking and proximity services. A tag transmits a "presence message", which can be received by one or more receiving devices. A tag typically uses a single communication technology. The tag that uses multiple communication technologies is costly, as the cost increases with the number of supported communication technologies. The tags typically transmit preconfigured identity messages over the available communication technique(s). While, the tag does not require all the features of the technology stack, the tag needs the entire communication stack for communication to occur. In an example, consider that the tag uses Bluetooth for communication, the tag for advertising its identity does not use features such as the Logical Link Control and Adaptation (L2CAP), Generic Attribute Profile (GATT), and so on.

A current solution discloses a Dual-Frequency RFID (Radio Frequency Identification) tag with isolated inputs, which requires sufficient memory and entire protocol stack compatible with UHF (Ultra High Frequency) RFID protocol for 860-960 MHz communications. However, this solution offers tracking (tagging) using only a single communication technique. This solution also requires the entire communication protocol stack for communication.

Another solution discloses a method for determining the location of a communication tag in a random phase multiple access communication technique by spreading a ranging request signal using a 1st and 2nd pseudo-noise code and offset with a 1st and 2nd random timing offset is transmitted at a first time. Further, a propagation delay that is dependent on the 1st and 2nd time is calculated. However, this solution requires an external device to send a communication to the tag, so that the external device can be aware of the presence of the tag.

Another solution discloses a multi-band, multi-mode RFID tag that uses a single antenna structure and integrated circuit to provide asset location information at any stage of a supply chain. This solution uses an on-chip frequency monitor in the integrated circuit to automatically determine which frequency is present and derives a local clock for the tag's integrated circuit. However, this solution requires the entire communication protocol stack for communication. However, this solution offers tracking (tagging) using only a single communication technique.

Another solution discloses a dual frequency RFID system comprises of dual frequency RFID tags, which operate at a first frequency band and a second frequency band using multiple antennas. However, this solution requires multiple antennas, resulting in an increase in cost and complexity and the I/Q samples are not stored locally.

SUMMARY

To address the above-discussed deficiencies, it is a primary object to provide a programmable and extendible tag that can work in at least one of transmit only, receive only or transmit/receive modes and can transmit/receive using a plurality of communication technologies, wherein the tag uses I/Q samples corresponding to each technology prestored on the tag.

Another object of the invention is to provide methods and systems for configuring the electronic tags using a configuration device, wherein the configuration device provides the I/Q samples of each technology to the tag.

Accordingly the invention provides a communication device comprising: a memory (203) configured to store at least one in-phase/quadrature (I/Q) sample for one of a plurality of communication techniques; a baseband module configured to: select at least one communication technique from the plurality of communication techniques; and select at least one I/Q sample corresponding to the selected communication technique; and a radio frequency module configured to transmit at least one message using the at least one selected I/Q sample and the selected communication technique.

The invention further provides a method for communication by a communication device, the method comprising storing at least one in-phase/quadrature (I/Q) sample for one of a plurality of communication techniques in a memory, selecting at least one communication technique from the plurality of communication techniques, selecting at least one I/Q sample corresponding to the selected communication technique, and transmitting at least one message using the at least one selected I/Q sample and the selected communication technique.

The invention further provides a method for configuring a communication device, the method comprising initiating a configuration mode, receiving information wherein the information includes or at least one I/Q sample, performing correlation between the received information and a stored information, storing the received information if the correlation is successful a, transmitting a beacon signal using a communication technique, wherein the communication technique corresponds to the at least one I/Q sample, and exiting the configuration mode if the communication device receives an indication that a verification is completed.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
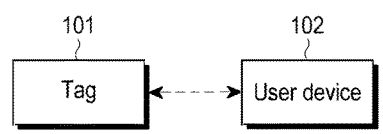
FIGS. 1A and 1B depict a tag communicating with at least one user device and being configured by a configuration device respectively, according to embodiments as disclosed herein.

FIGS. 1A through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose a programmable and extendable analog tag that can work in at least one of transmit only, receive only or transmit/receive modes and can transmit/receive using a plurality of communication technologies. Referring now to the drawings, and more particularly to FIGS. 1 through 16, where similar reference characters denote corresponding features consistently throughout the figures, there are shown example embodiments.

Figure 1B:
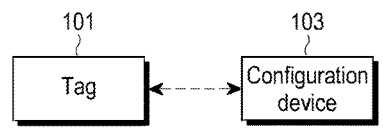

FIGS. 1A and 1B depict a tag communicating with at least one user device and being configured by a configuration device respectively. Embodiments herein disclose a programmable and extendable electronic device (hereinafter referred to as a tag) 101 that uses a single RF (Radio Frequency) front end, without the need for a technology specific stack. The tag 101 can be configured with one or more I/Q samples, periodicity of transmissions and technology to be used for transmissions by an authorized user. The tag 101 enables the I/Q samples to be constructed offline on an external receiving/transmitting device (hereinafter referred to as a user device) 102. The tag 101 can transmit data to the user device 102, as required. The user device 102 can also transmit data to the tag 101, as required. The user device 102 can be at least one of a mobile phone, computer, laptop, a tablet, a smart phone, a wearable computing device, a scanning device, a dedicated device, or any other device capable of receiving/transmitting data from/to the tag 101.

The tag 101 can be configured using an external configuration device (hereinafter referred to as a configuration device) 103. The configuration device 103 can be at least one of a mobile phone, computer, laptop, a tablet, a smart phone, a wearable computing device, a scanning device, a dedicated device, or any other device capable of communicating with the tag 101. In an embodiment herein, the user device 102 and the configuration device 103 can be the same device. In an embodiment herein, the user device 102 and the configuration device 103 can be different devices.

The tag 101 disclosed herein works in at least one of transmit only, receive only or transmit-receive modes on multiple communication technologies. The tag 101 can use at least one communication technique for communication, such as WiFi® (ex, 2.4 GHz, 5.2 GHz), Bluetooth®, Bluetooth Low Energy® (BLE), cellular networks, IEEE 802.15.4, LPWANs (Low-Power Wide-Area Network), LTE (Long Term Evolution), LTE unlicensed (LTE-U) or any other equivalent means for communication with the user device 102 and/or the configuration device 103. The tag 101 can be extended to include new technologies without hardware/software changes/dependency. The tag 101 can be configured to work on different beacon message formats.

The tag 101 may not use the complete technology-specific protocol stack for baseband processing, during communication. The tag 101 can also act as a 3GPP (LTE) Base Station. The tag 101 can perform Listen Before Talk (LBT), as configured. The LBT further comprises performing energy detection. The tag 101 can select a transmission technology and switch between technologies for best performance, as required. The transmit-only mode comprises of achieving a transmit functionality without baseband processing by (externally) computing the I/Q samples required for the target over-the-air message and storing in a memory present in the tag 101 along with the technology-specific parameters (bandwidth, sampling rate and so on) and transmission periodicity. The transmit functionality can comprise of optimally configuring system parameters to aid quick discovery of the tag 101 by access points. The receive-only mode further comprises of achieving a receive functionality without baseband processing by correlating with pre-stored I/Q samples computed offline. The tag 101 can perform energy detection for presence of signal and synchronization purposes. The support for multiple technologies further comprises of I/Q samples for the new technology being added and the relevant system parameters (bandwidth, sampling rate etc.) being configured.

Figure 2:
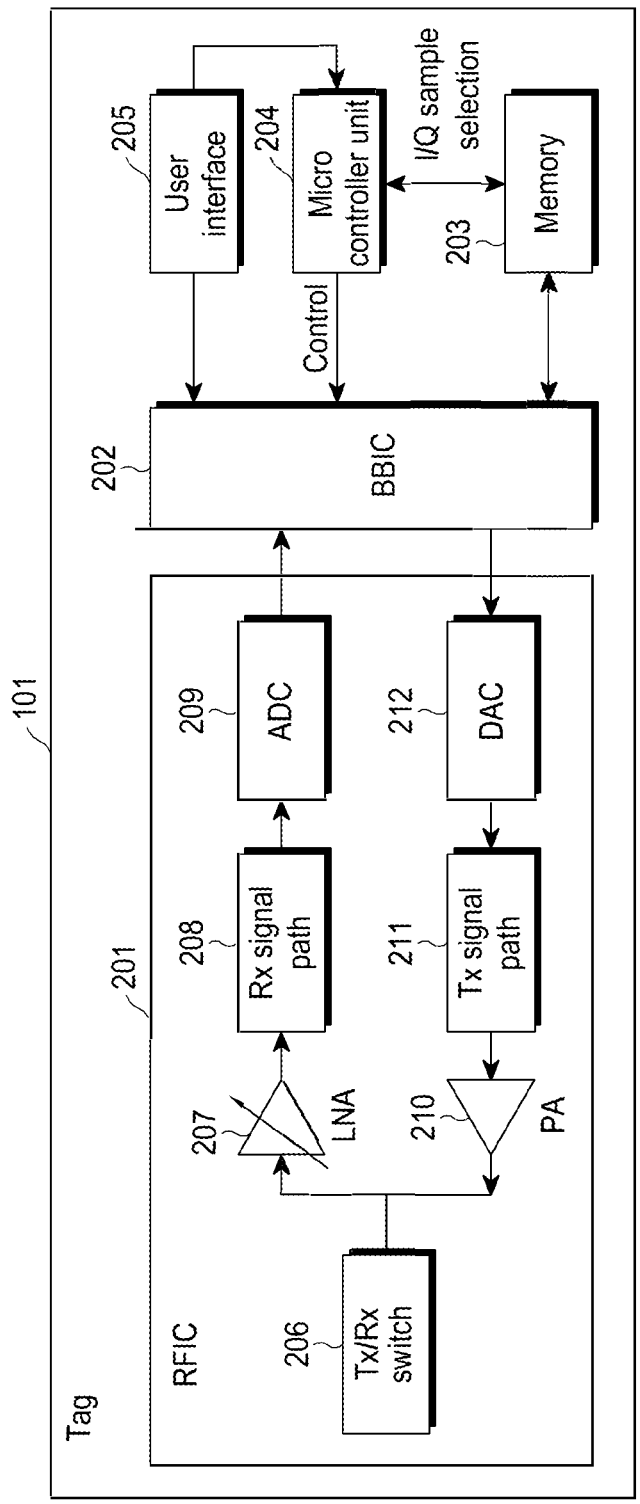
FIG. 2 depicts the tag, according to embodiments as disclosed herein.

FIG. 2 depicts the tag. The tag 101 comprises of a Radio Frequency Integrated Circuit (RFIC) 201, a Baseband Integrated Circuit (BBIC) 202, at least one memory 203, a micro controller unit 204, and at least one user interface 205. The RFIC 201 can further comprise of a Tx/Rx switch 206, a low noise amplifier (LNA) 207, Rx signal path 208, an analog to digital converter (ADC) 209, a power amplifier (PA) 210, a Tx signal path 211, and a digital to analog converter (DAC) 212. The BBIC 202 can comprise of at least one of a DSP (Digital Signal Processor) or an application-specific integrated circuit (ASIC). The memory 203 can comprise of the I/Q baseband samples, as configured. The memory 203 can comprise of I/Q samples for each communication technique that the tag 101 can use for communication. The memory 203 can also comprise of additional information such as periodicity of transmissions, technology to be used for transmissions, a unique ID for the tag 101, and so on. The micro controller unit 204 can provide control instructions to the BBIC 202. The micro controller unit 204 can fetch information from the memory 203, as required. The micro controller unit 204 can store information in the memory 203, as required. The user interface 205 can comprise of one or more interfaces such as buttons, switches, toggles, indicators (such as one or more lights, and so on), displays and so on. The user interface 205 can enable the user to turn on/off, suspend the tag 101, as required. The user interface 205 can also enable the user to perform additional tasks, management, and control related functions on the tag 101.

The BBIC 202 can select at least one available technique for communication. In an embodiment herein, the BBIC 202 can select the technique automatically. In an embodiment herein, the BBIC 202 can select the technique based on a configuration done by a user. In an embodiment herein, the BBIC 202 can select the technique based on geographic location (geo-location). The BBIC 202 can select the technique based on other parameters such as network availability, QoS (Quality of Service), date/time, and so on. Based on the selected communication technique, the BBIC 202 can select at least one stored I/Q sample from the memory 203 corresponding to the selected communication technique. The RFIC 201 can transmit one or more messages encoded using the selected I/Q sample to indicate information such as location information of the tag 101.

In an embodiment herein, the tag 101 can comprise of a geo-location means such as a GPS (Global Positioning System) sensor, to enable the tag 101 to determine its location. The tag 101 can also use means such as triangulation, and so on, to determine the location.

In an embodiment herein, RFIC 201 may be replaced with a transceiver, and BBIC 202 and micro controller unit 204 may be replaced by a controller. Meanwhile, the RFIC 201 can be regarded an RF module, and the BBIC 202 can be regarded a baseband module. A tag device is an example of a communication device.

Figure 17:
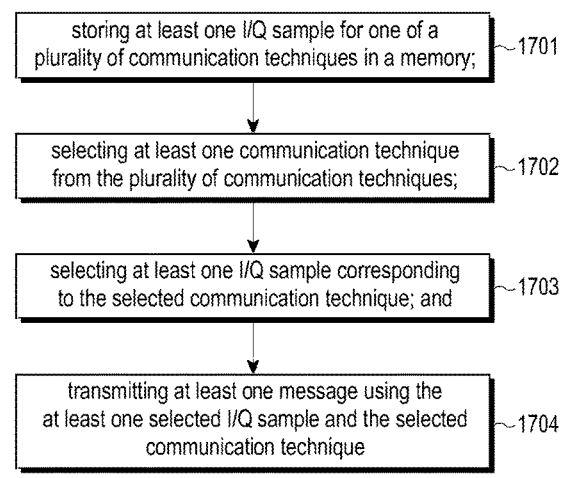
FIG. 17 is a sequence diagram depicting a method for communication by a tag device.

FIG. 17 is a sequence diagram depicting a method for communication by a tag device.

Referring to FIG. 17, the method comprises: storing at least one in-phase/quadrature (I/Q) sample for one of a plurality of communication techniques in a memory (1701), selecting at least one communication technique from the plurality of communication techniques (1702), selecting at least one I/Q sample corresponding to the selected communication technique (1703), and transmitting at least one message using the at least one selected I/Q sample and the selected communication technique (1704). The description of each step is as described above in the description related to FIG. 2.

Figure 3:
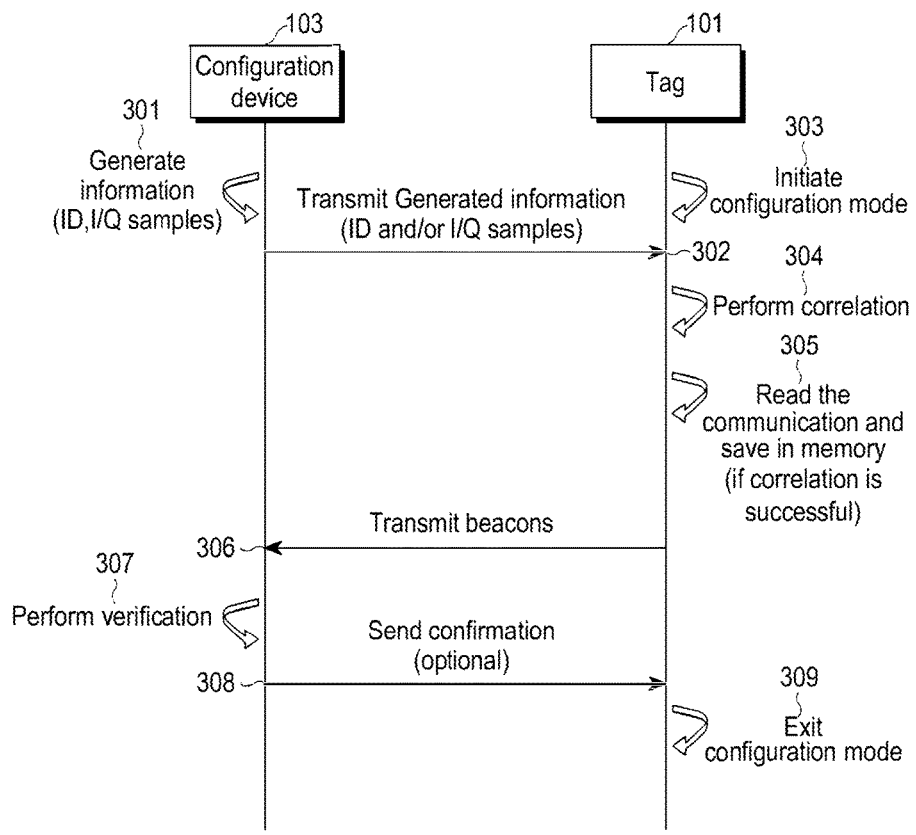
FIG. 3 is a sequence diagram depicting a method for enabling a configuration device to configure a tag, according to embodiments as disclosed herein.
Figure 4:
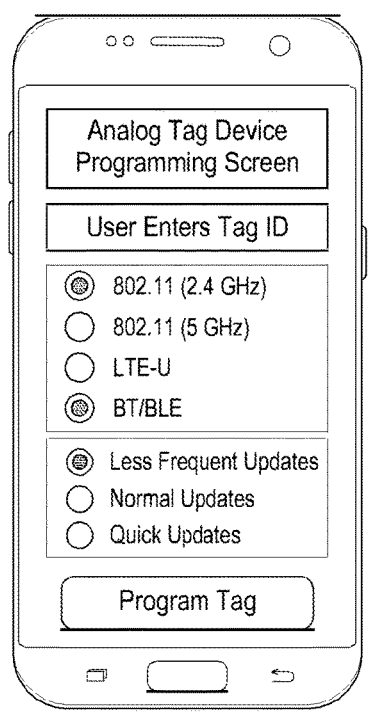
FIG. 4 depicts an example screenshot of an application residing on a configuration device, wherein the application can be used for configuring the tag, according to embodiments as disclosed herein.

FIG. 3 is a sequence diagram depicting a method for enabling a configuration device to configure a tag. The configuration device 103 comprises an application for enabling the user to configure the tag 101. An example screenshot of the application residing on a mobile phone is depicted in FIG. 4. As depicted in the example, the user can select at least one communication technique that can be used by the tag 101 for communication. The user can also configure options such as frequency of updates, the frequency/frequencies to be used for communication by the tag 101, the bandwidth, sampling rates, and so on.

On the application being initiated, the configuration device 103 generates (301) information such as an ID for the tag 101, and at least one I/Q sample. In an embodiment herein, the application can generate the ID. In an embodiment herein, the user can provide the ID. The I/Q sample(s) generated can depend on the communication technique s that can be used by the tag 101. The configuration device 103 transmits (302) the generated information to the tag 101, using a communication link. In an embodiment herein, the configuration device 103 transmits only the ID. In an embodiment herein, the configuration device 103 transmits the I/Q samples. In an embodiment herein, the configuration device 103 transmits both the ID and the I/Q samples. The communication link between the tag 101 and the configuration device 103 can be at least one of a wired link (such as USB (Universal Serial Bus), micro USB, or any other equivalent means) or a wireless link (such as Wi-Fi®, cellular, Bluetooth®, BLE, or any other equivalent means).

A tag 101 can initiate (303) a configuration mode, either automatically or on receiving a user input using the user interface 205. In the configuration mode, the tag 101 can start scanning for a pre-defined signature (for example, a BLE signature). At least one format of the communication to be received by the tag 101 can be pre-defined and stored in the memory 203. On detecting a potential communication, the tag 101 performs (304) correlation between the stored format and the received communication. If the correlation is successful, the tag 101 reads (305) the received communication and extracts the ID. The tag 101 saves the received ID and the I/Q samples in the memory 203. The tag 101 starts transmitting (306) a beacon message/signal using at least one communication technique. The beacon message can be the same as the communication received from the configuration device 103. The tag 101 can broadcast the beacon message for a pre-defined period of time. The configuration device 103 receives the beacon message broadcasted by the tag 101 and the configuration device 103 performs (307)

verification. The verification comprises of the configuration device 103 validating that the tag 101 has been configured with the ID. In an embodiment herein, on receiving an indication from the configuration device 103 that the configuration has been completed, the user can use the user interface 205 to exit (309) the configuration mode in the tag 101. In an embodiment herein, the configuration device 103 can send (308) a confirmation to the tag 101 and the tag 101 can exit (309) the configuration mode automatically.

Figure 5:
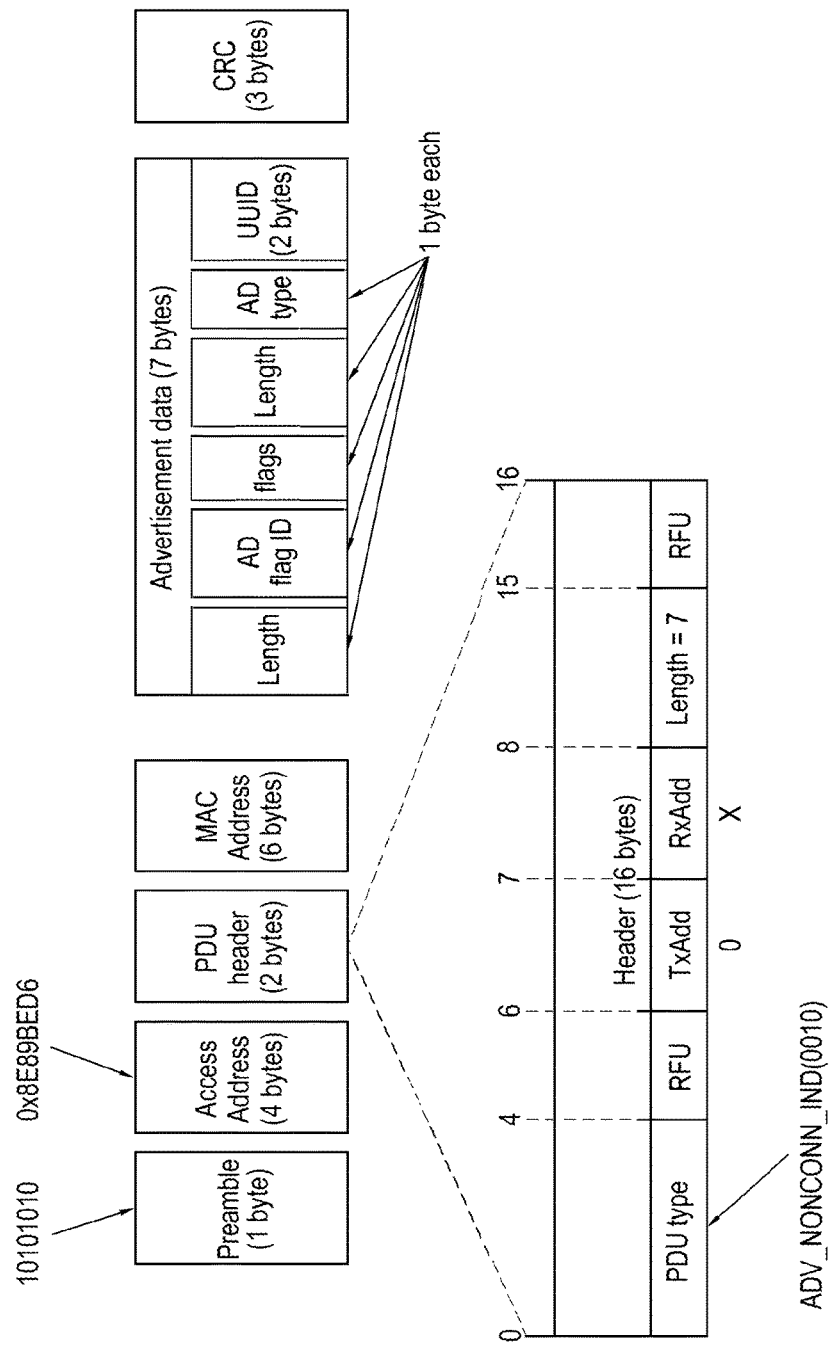
FIG. 5 depicts an example of I/Q samples for a BLE beacon frame, according to embodiments as disclosed herein.

Consider an example where the tag 101 sends BLE beacons as the beacon signal, as the communication received from the configuration device 103 is a BLE beacon. FIG. 5 depicts an example of I/Q samples for the BLE beacon frame. The standard BLE data packet length is 23 bytes. Each sample is of 6 bits.

MAX_NUM_PHY_SAMPLE
 ((MAX_NUM_PHY_BYTE*8*SAMPLE_PER_SYMBOL)+
 (LEN_GAUSS_FILTER*SAMPLE_PER_SYMBOL)),
SAMPLE_PER_SYMBOL=4,
LEN_GAUSS_FILTER=11

For num phy byte=23, the total number of samples is 780 bytes ((23*8+11)*4), which is the memory required to store the I/Q samples for the BLE beacon on the tag 101.

Figure 6:
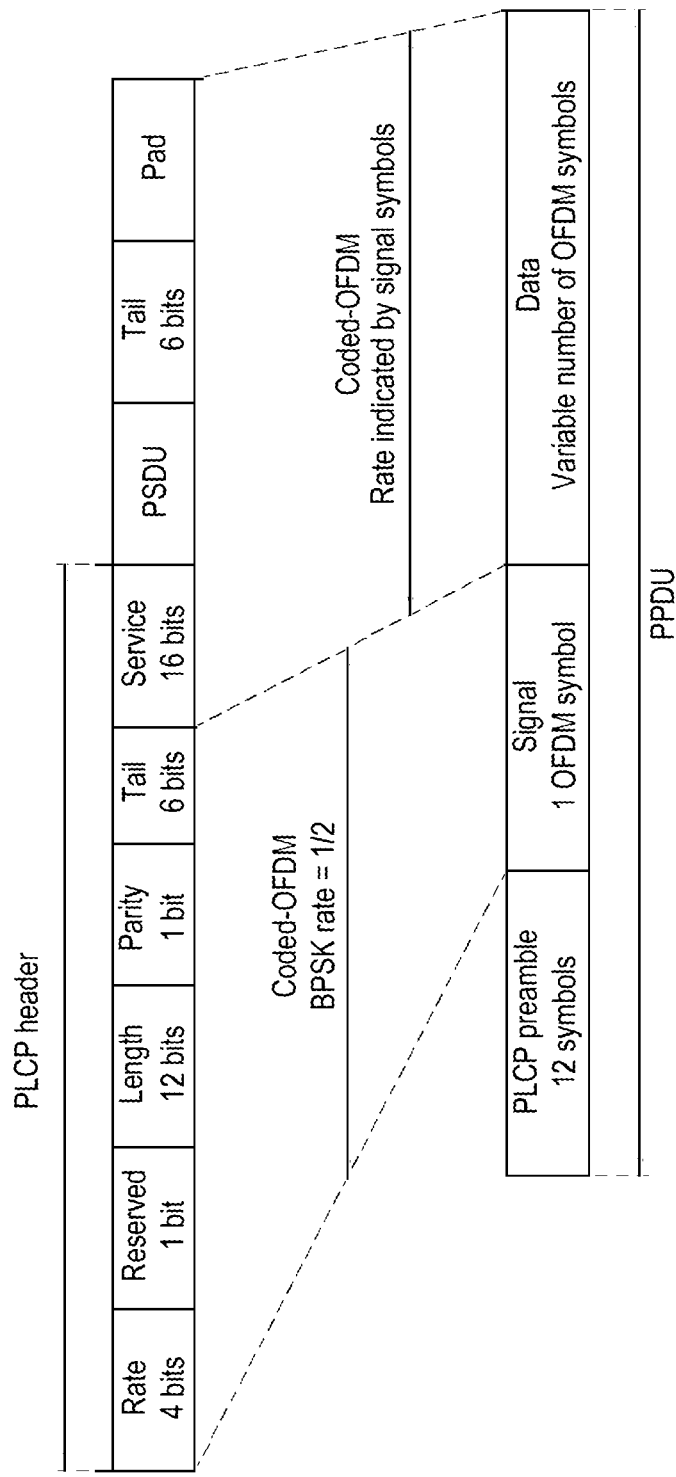
FIG. 6 depicts an example of I/Q samples for a Wi-Fi® beacon frame, according to embodiments as disclosed herein.

Consider an example where the tag 101 sends WiFi® beacons as the beacon signal, as the communication received from the configuration device 103 is a WiFi® beacon. FIG. 6 depicts an example of I/Q samples for the Wi-Fi® beacon frame. Assuming 8-bit DAC, One I/Q sample=2 Bytes
One Short Symbol=16 I/Q Samples=32 Bytes
One Long Symbol=64 I/Q Samples=128 Bytes
BPSK Rate=1/2
Number of Data Sub-carriers=48
Un-coded bits=24 bits=3 Bytes
PLCP Preamble: One short symbol+One Long Symbol
I/Q sample requirement=160 Bytes
PLCP Header: Un-coded bits=24 bits=3 Bytes
Rate=1/2 ➜ Number of Long symbols=1 Symbol
I/Q sample requirement=128 Bytes
Service+Tail+Pad: Assume Pad=2 bits
Total number of un-coded bits=24
BPSK Rate=1/2 ➜ Number of Long Symbols=1
I/Q sample requirement=128 Bytes
PSDU
Wi-Fi Beacon length=118 bytes. Assuming 120 bytes,
BPSK Rate=1/2 ➜ Number of Long Symbols=120/3=40 Symbols
I/Q sample requirement=40×128 Bytes=5120 Bytes So, less than 6 KB of memory is required to store the I/Q samples of the Wi-Fi® beacon in the tag 101.

Figure 7:
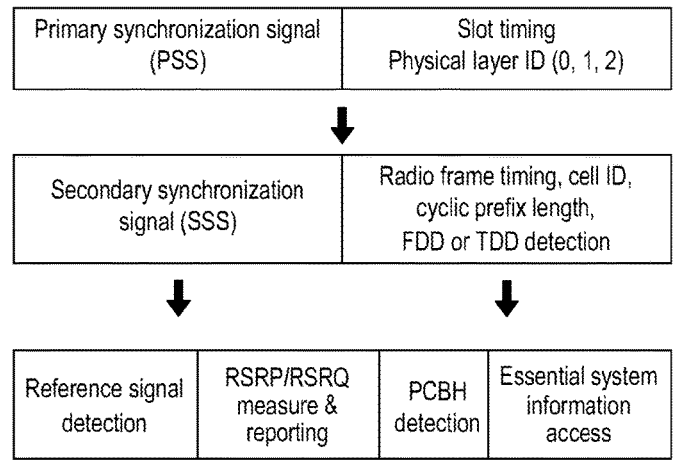
FIG. 7 depicts an example of I/Q samples for a LTE-U beacon frame, according to embodiments as disclosed herein.
Figure 7:
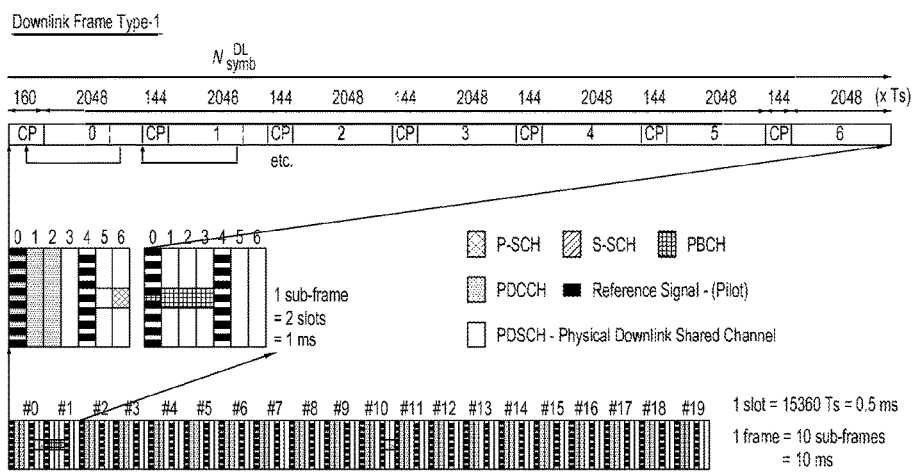

Consider an example where the tag 101 sends LTE-U (LTE in unlicensed spectrum) beacons as the beacon signal, as the communication received from the configuration device 103 is a LTE-U beacon. FIG. 7 depicts an example of I/Q samples for the LTE-U beacon frame. The parameters are as follows:

System Bandwidth=1.4 MHz
FFT Size=128
Required signals: PSS, SSS, MIB, SIB1, SIB2
Need 6 properly formatted sub-frames, with one dummy sub-frame repeated
Hence, 6×14=84 OFDM symbols of size 128 each
Assuming 8-bit DAC, the total I-Q storage is 6×14×128×2=21 KB The above estimate can be significantly optimized because most of the symbols will be exactly the same, hence, assuming 20 different symbols, storage=5 KB. Thus, 5 Kbytes of memory is required to store I/Q samples for the tag 101.

Figure 8:
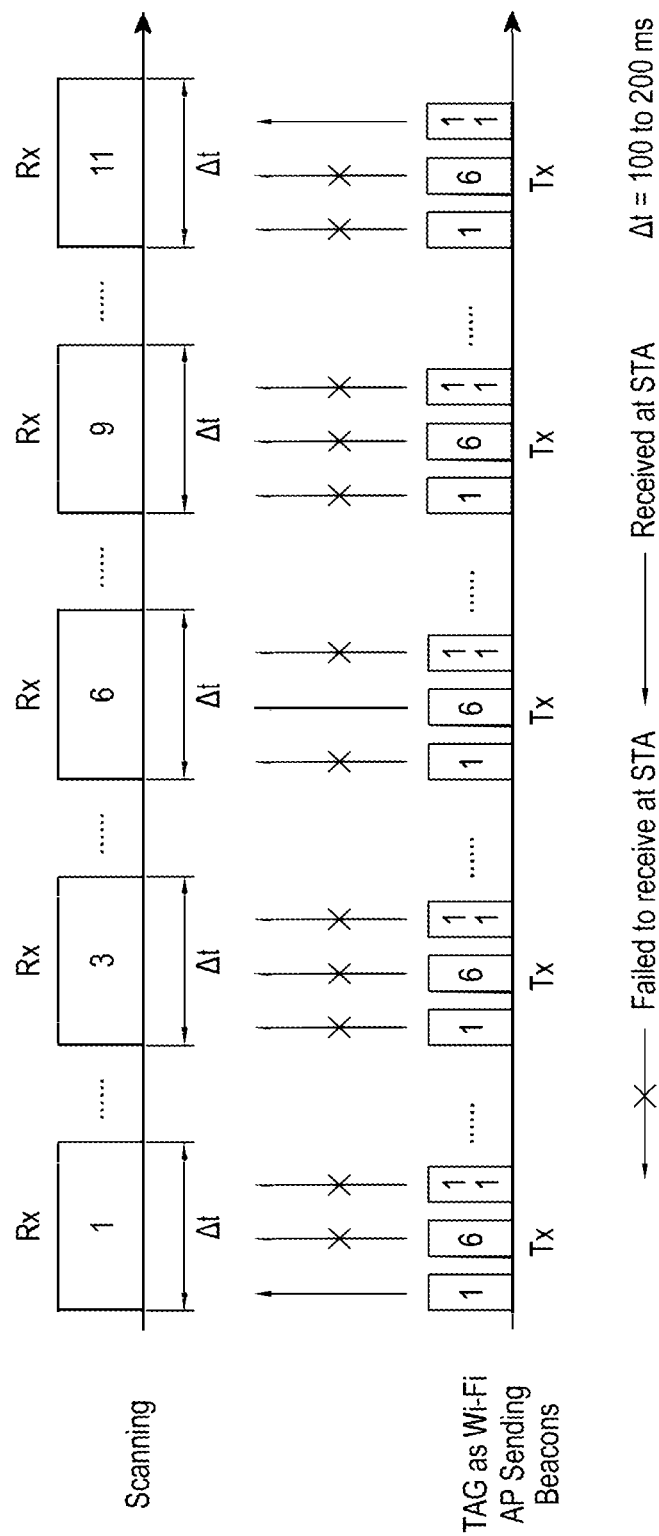
FIG. 8 depicts an example mechanism for tag detection by performing passive scanning on a WiFi® network, according to embodiments as disclosed herein.

FIG. 8 depicts an example mechanism for tag detection by performing passive scanning on a WiFi® network. Passive scanning at the user device 102 ensures that there is no need for performing continuous scanning at the user device 102. Passive scanning comprises of the user device 102 scanning channels for a beacon. The user device 102 can perform the scanning at pre-defined intervals, wherein the intervals can be at least one of uniform or random. The micro controller unit 204 can configure the tag beacon advertisements on different channels to reduce the detection time. The micro controller unit 204 can select a set of most popular Wi-Fi® channel(s), which are typically scanned for a longer duration by the user device 102, as compared to less popular/less social channels (e.g. NAN (Neighbour Aware Network)), as the channels to advertise can be selectively chosen.

Figure 9:
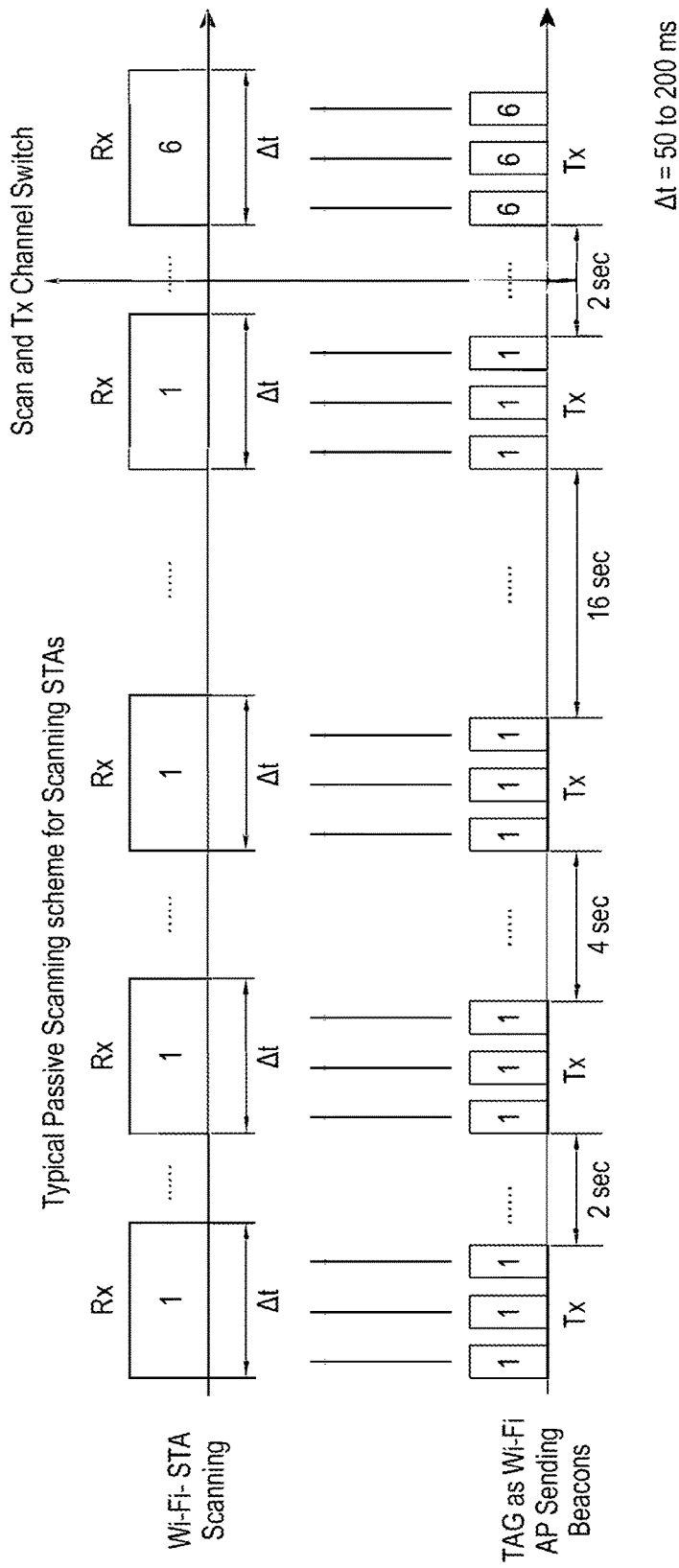
FIG. 9 depicts a mechanism for tracking the beacon, according to embodiments as disclosed herein.

FIG. 9 depicts a mechanism for tracking the beacon by modifying a dynamic interval. In an embodiment herein, the tag 101 can send a seed value indicating next advertising instance. In an embodiment herein, the tag 101 can follow a fixed advertising pattern. For a first iteration, the tag 101 can send data on a single channel, multiple times to avoid losses. For the next iteration, the tag 101 can switch to another channel on the next iteration. For example, if the tag 101 uses channel 1 for the first iteration, the tag 101 uses channel 6 for the next iteration. The user device 102 can be configured to scan only on the desired channel at instances decided by the seed value of the tag or using a predefined scanning pattern for a short duration. The larger scanning interval results in the tag 101 and the user device 102 performing less scanning, hereby reducing the power consumption.

Consider an example scenario, where a tag 101 is to be tracked and the tag 101 is known to be transmitting using LTE-U. In LTE-U, the user device 102 performs cell search naturally. The user device 102 advertises the ID of the tag 101 to be tracked in public advertising systems/services like CMAS/KPAS (Commercial Mobile Alert System/Korean Public Alert System). The tag 101 acts as an LTE base station with a specific kind of identity (for example, special PLMN (Public Land Mobile Network) identity or cell identity). When a device that has received the missing advertisement, detects this cell, it reports the detected identity to at least one authorized person and/or entity (such as the user device 102). This significantly improves the detection performance of the tag 101. No dedicated infrastructure is required for detecting the missing tag 101. The example as disclosed can be applicable for other communication technique s such as WiFi®, BLE, and so on.

Figure 10:
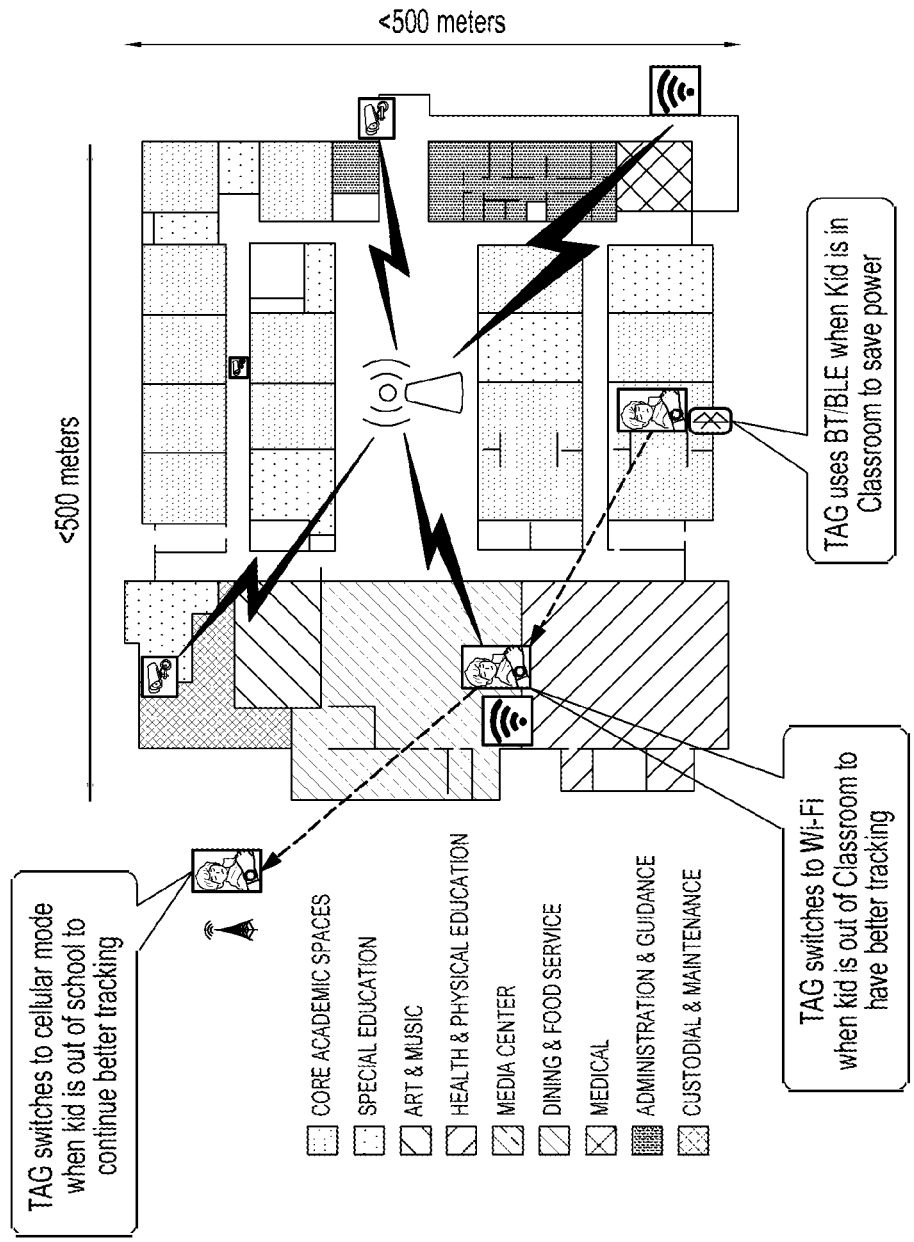
FIGS. 10, 11, 12A, 12B, 12C, 13, 14, 15A and 15B depict example use cases, according to embodiments as disclosed herein.

FIGS. 10, 11, 12A, 12B, 12C, and 14 depict example use cases. In FIG. 10, embodiments herein can be used for tracking and monitoring children in an educational institution. Embodiments herein do not require a dedicated infrastructure. The tag 101 can be used for school attendance, safety monitoring, securing the play area/playground, monitoring the wellness/health of students and ensuring quick and proper care for the students, monitoring unsafe/unwanted (personnel) proximity, secure transportation, tracking and emergency assistance, and distress notifications from the student(s). Embodiments herein can enable vision assisted RSSI (Received Signal Strength Indicator) based tracking in school analysis. For example, school analysis can use local data and analytics. In an example, consider the play area. Embodiments herein can be used for detecting and avoiding unsafe play practices, avoiding access to 'restricted/risky/unsafe' areas, vision assisted proximity detection and avoidance of unauthorized companions, and so on. In another example, the tag 101 can enable personalized health monitoring by using customized sensors based on the health history of the student and in a medical emergency, the tag 101 can notify at least one authorized person to enable a quick response. In another example, the tag 101 can provide alerts in an emergency scenario. The student can trigger the alert using the tag 101. The tag 101 can provide automated alerts using pre-configured criteria such as geo-fencing, date, time, and so on.

Figure 11:
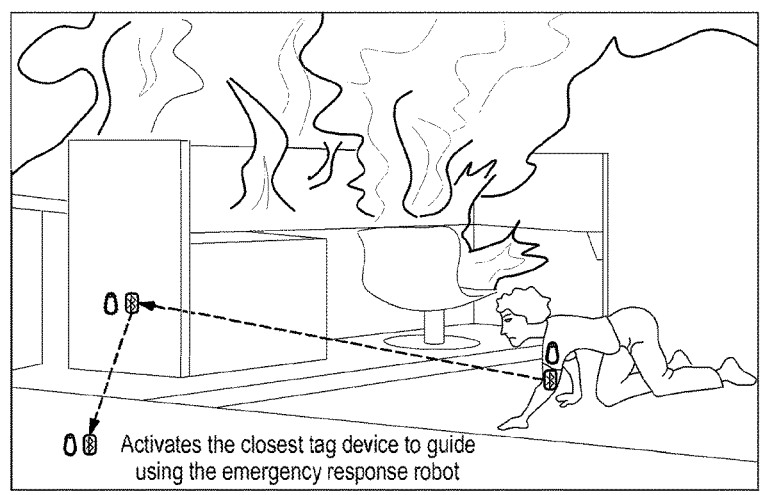

FIG. 11 depicts the tag being used in an emergency response and guidance system. The tag 101 can be used to guide trapped users. The tag 101 can provide guidance by enabling the user to detect and avoid unsafe/dangerous paths. The tag 101 can guide them using a guide robot to avoid 'risky/prohibited' areas. The tag 101 can also comprise of means for emergency personal/rescue team to detect the user. The tag 101 can enable the rescue team to send updates to users about the emergency situation such as entry/exit points, safe routes, unsafe routes, and so on. The tag 101 can provide alerts. The user can trigger the alert using the tag 101. The tag 101 can provide automated alerts using pre-configured criteria such as geo-fencing, a lack of response from the user for a pre-defined time period, date, time, and so on.

Figure 12A:
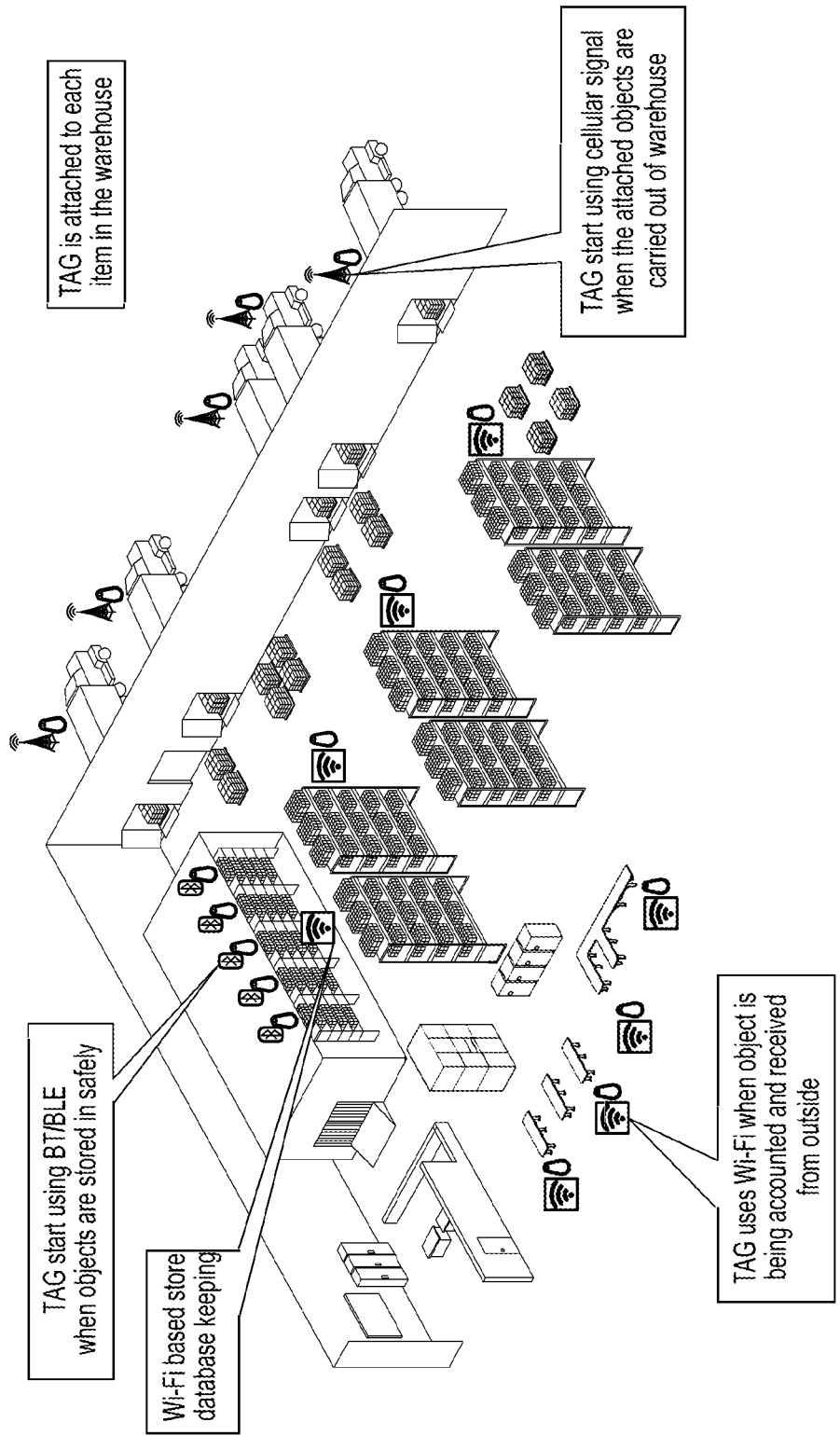
Figure 12B:
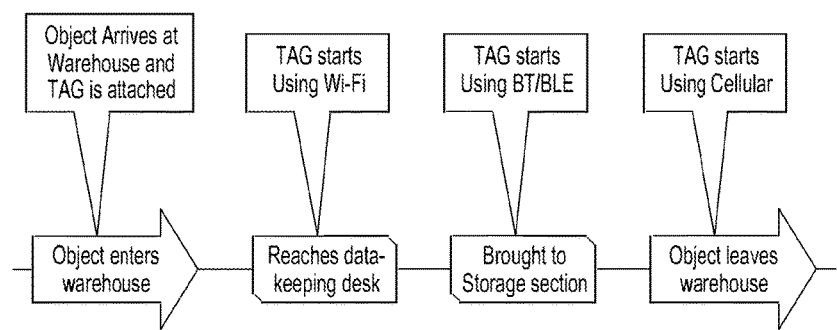
Figure 12C:
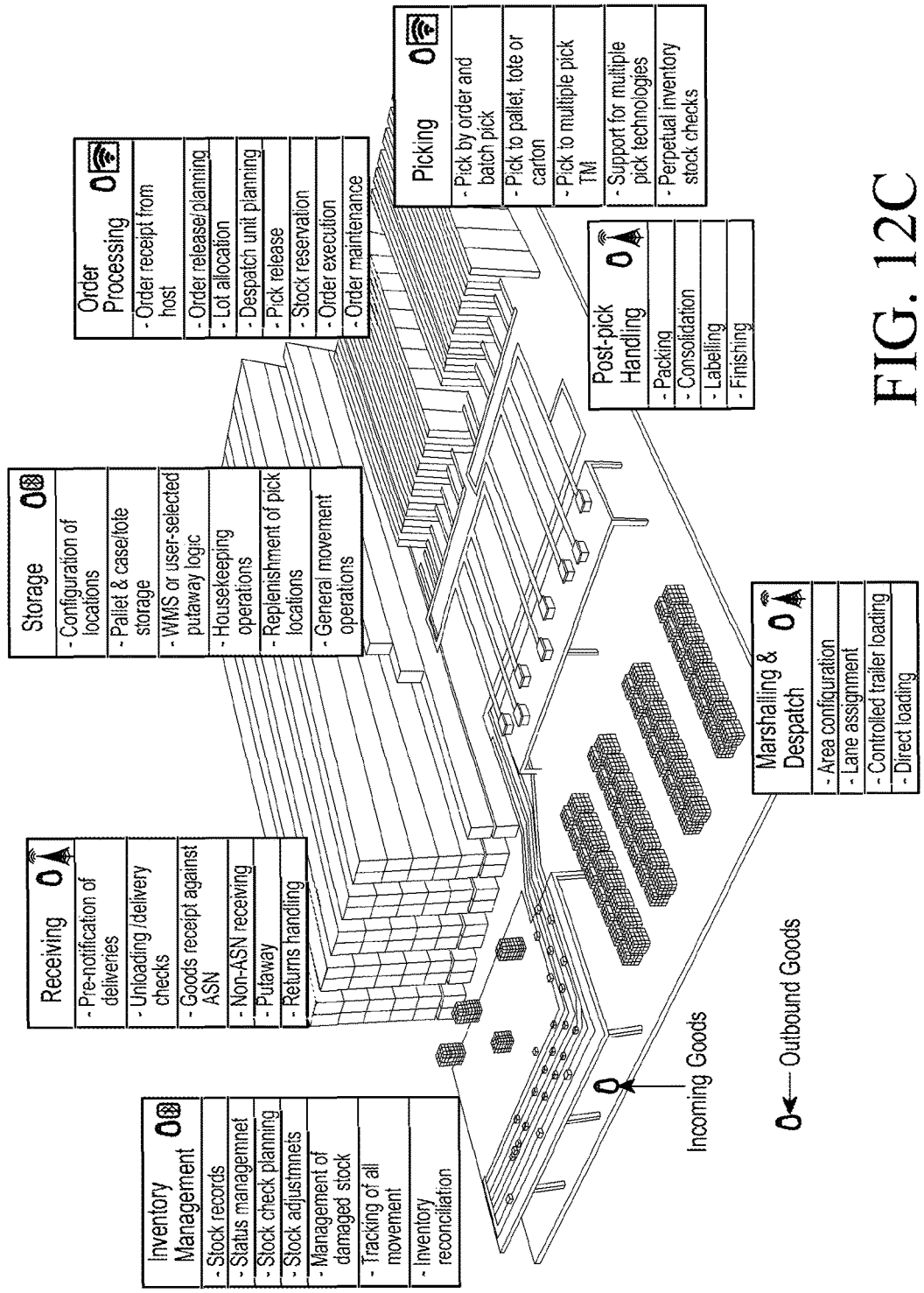

FIGS. 12A, 12B, and 12C depict use of the tag in a tracking and management system (such as a warehouse). Here, the tag 101 is attached to all items stored in the warehouse. The tag 101 can use short range communication means such as Bluetooth, BLE, when stored in the warehouse. The warehouse can use a longer range communication means such as WiFi® for database keeping and when an item is being accounted and received from outside. In the example depicted in FIG. 10B, on an object entering the warehouse, a tag 101 is attached to the object. On reaching the data keeping desk, the tag 101 starts using Wi-Fi® (can be triggered manually or automatically using a means such as geofencing) and the tag 101 is scanned. On reaching the storage section, the tag 101 starts using BLE (can be triggered manually or automatically using a means such as geofencing). On the object leaving the warehouse, the tag 101 starts using a cellular based communication means. The cellular connection can be triggered manually or automatically using a means such as geofencing.

The tag 101 can assist in inventory management by providing information that can be used for stock records, status management, stock check planning, stock adjustments, management of damaged stock, tracking of movement of items, inventory reconciliation, and so on. The tag 101 can assist in the receiving process by enabling pre-notification of deliveries, unloading/delivery checks, goods receipt against ASN (Advanced Shipping Notice), non-ASN receiving, putaway, returns handling, and so on. The tag 101 can assist in storage such as configuring storage location, pallet/case/tote storage, WMS/user selected putaway logic, housekeeping operations, replenishment of pick location, general movement operations, and so on. The tag 101 can assist in the processing of orders such as providing information related to order receipt from the host, order release planning, lot allocation, dispatch unit planning, pick release, stock reservation, order execution, order maintenance, and so on. The tag 101 can assist in the process of picking orders by enabling picking order by at least one of order and batch pick, picking a pallet/tote/carton, picking multiple TMs, support for multiple pick technologies, perpetual inventory stock checks, and so on. The tag 101 can assist in post-pick handling by assisting in packing, consolidation, labeling and finishing. The tag 101 can assist in marshaling and dispatch by assisting in area configuration, lane assignment, controller trailer loading, direct loading, and so on.

Figure 13:
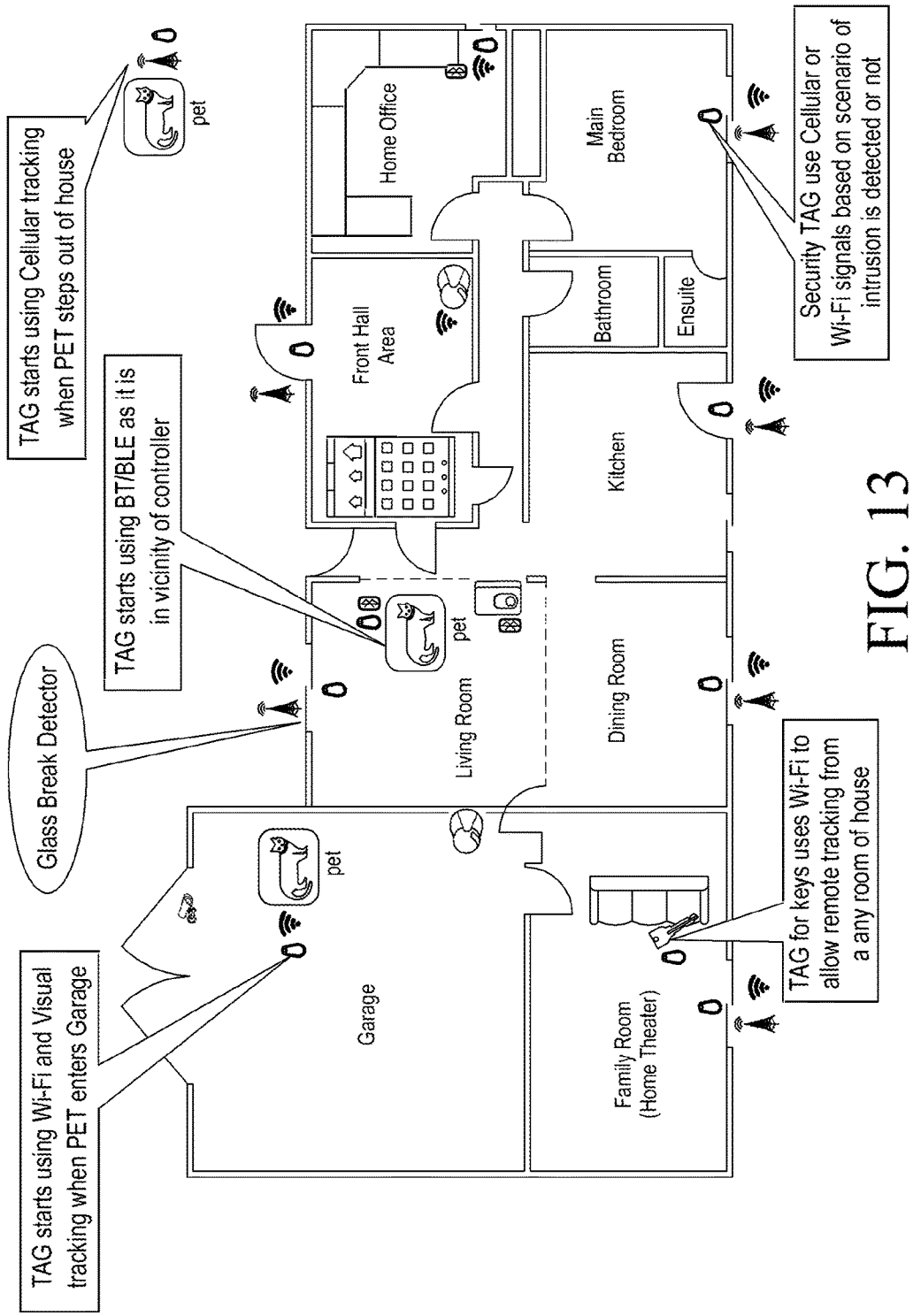

FIG. 13 depicts a use case scenario for home security and tracking. Consider an example scenario where a pet is being tracked, wherein the tag 101 is attached to the pet. The tag 101 can use means such as WiFi®, visual tracking, and so on, when the pet is in a pre-defined location such as the garage. When the pet is in the vicinity of the user device 102, a short range communication means (such as Bluetooth, BLE, and so on) can be used to track the pet. The tag 101 can use a means such as cellular tracking, when the pet is out of the house. The tag 101 can also enable tracking of items such as keys, remotes, phones, and so on. The tag 101 can detect intrusions by being placed at potential points of entry/exit and can trigger an alert using a suitable means such as WiFi®, cellular communication and so on.

In a use case, the tag 101 can be used as a personal beacon. The tag 101 can be used for tracking missing people, objects, mapping in real time. The tag 101 can repeatedly transmit identity messages over different technologies such as Wi-Fi®, BLE, Bluetooth®, 802.15.4, LPWANS, 3GPP (Rel. 4, 5, 6, 7, 8, 9, 10, 11, 12, 13, . . . ), by posing as a Wi-Fi® Access Point (using Wi-Fi® beacon, Probe Response and so on), posing as a 3GPP base station (using PSS, SSS, MIB, SIB1/2, and so on), MBMS frames, CMAS frames and so on.

Figure 14:
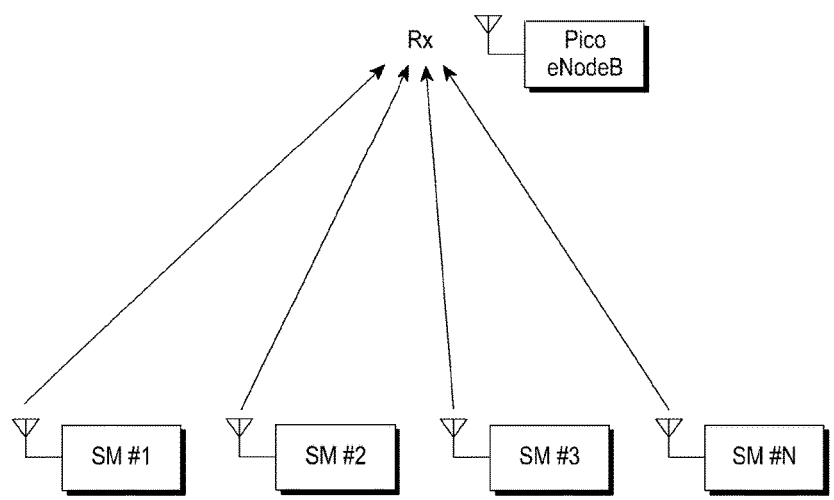

FIG. 14 depicts a use case scenario in a cellular IoT network. Assume N smart meters communicating with a common eNodeB. Uplink data from SM to eNB is data driven. For example, when power consumed equals M KW (where M is an integer), a packet is sent to the eNB. The receiving device has to only correlate the received information with pre-configured/stored messages.

Figure 15A:
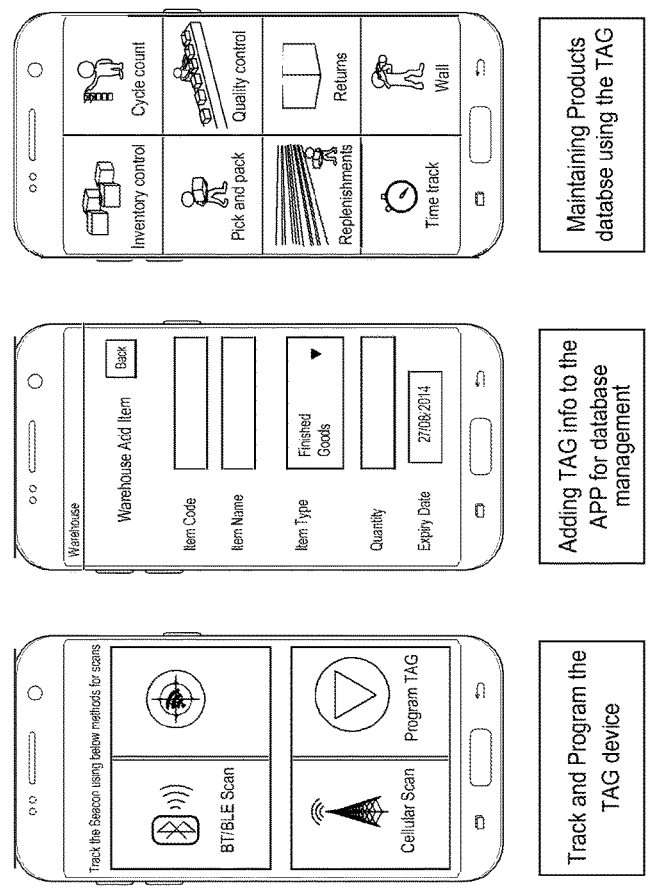
Figure 15B:
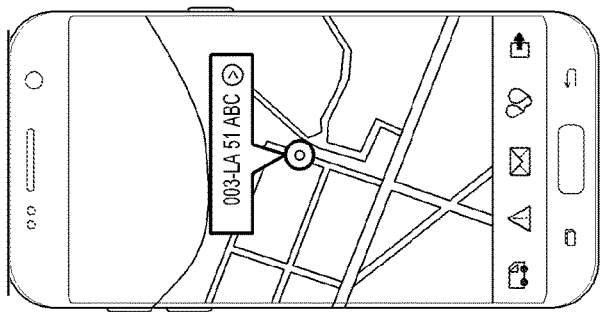
Figure 15B:
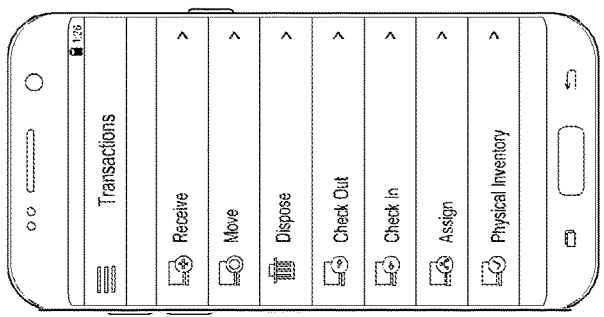
Figure 15B:
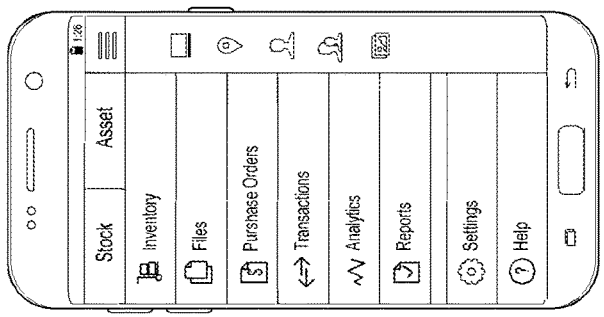

FIGS. 15A and 15B depict example screenshots of a user interface for tracking inventory. In FIG. 15A, the user can track and program the tag using the external device. The user can add information related to the tag to the application. The user can maintain a database of products. In FIG. 15B, the user can track inventory using the application, wherein the application can analyze product shipping statistics in real time. The user can monitor and coordinate various transactions using the tags. The user can use the cellular mode of the tag to track the tag and other related information.

Figure 16:
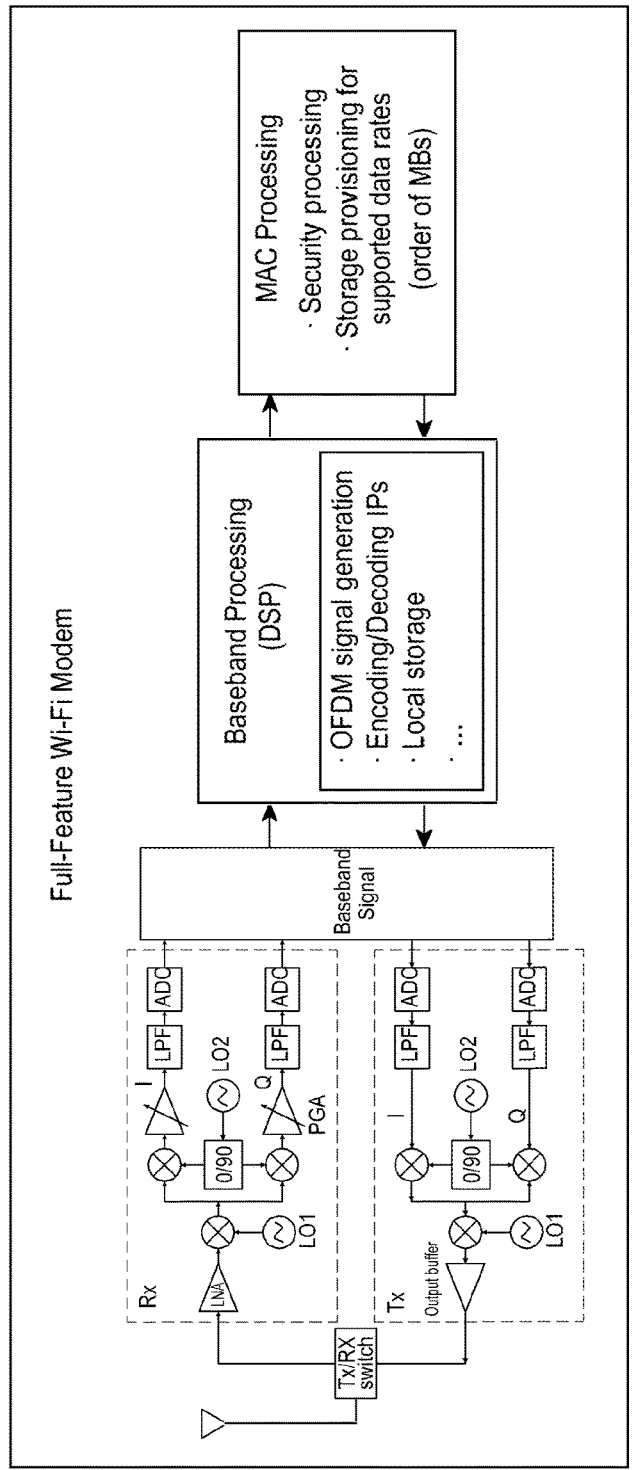
FIG. 16 depicts a comparison of the tag with full stack solutions, according to embodiments as disclosed herein.

FIG. 16 depicts a comparison of the tag with full stack solutions. Embodiments herein provide significant saving by removing the need for Digital Baseband, MAC processing and proprietary stack solutions.

The tag 101 as disclosed herein can transmit a beacon for a new communication type, by configuring the tag 101 with the required I/Q samples using the configuration device 103. For example, if the tag 101 wants to increase the beacon transmission range, the tag 101 can switch to a communication type with a longer range (say, from BLE to Wi-Fi®).

The tag 101 can function as a beacon of any standard. The I/Q samples abstract out the complete messages. There is also no need to program individual layers of the protocol stack. For example, I/Q samples can be directly generated to comply with iBeacon format, or URL Beacon format without configuring the GAP (Generic Access Profile) layer in BLE.

Embodiments disclosed herein provide savings by avoiding the use of baseband, MAC (Media Access Control) processing and proprietary and complete technology specific protocol stack solutions. Embodiments disclosed herein provide minimal memory requirements, as compared to a full-featured communication modem. Embodiments disclosed herein use a general purpose microcontroller, resulting in a reduction in cost and complexity. Embodiments disclosed herein do not require complicated baseband processing, hereby reducing the hardware cost. Embodiments disclosed herein provide improved battery performance and longevity, as the per-transmission processing is reduced leading to a reduction in current consumption.

The embodiments disclosed herein can be implemented through at least one software program running on at least one hardware device and performing network management functions to control the elements. The elements shown in FIGS. 1, and 2 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication device comprising:
   a memory configured to store a plurality of in-phase/quadrature (I/Q) samples including at least one I/Q sample corresponding to each one of a plurality of radio access technologies (RATs);
   a baseband module configured to:
      select a RAT from the plurality of RATs; and
      select at least one I/Q sample corresponding to the selected RAT, among the plurality of I/Q samples; and
   a radio frequency (RF) module configured to transmit at least one message using the at least one selected I/Q sample and the selected RAT.

2. The communication device of claim 1, wherein the RF module comprises a single transceiver.

3. The communication device of claim 1, wherein the at least one I/Q sample is provided from a configuration device.

4. The communication device of claim 1, wherein the communication device is configured to select the RAT based on at least one of a user configuration, automatic detection, and geographic location (geo-location) of the communication device.

5. The communication device of claim 1, wherein the plurality of RATs include WiFi®, cellular, Bluetooth, or Bluetooth low energy (BLE), LTE-unlicensed (LTE-U).

6. The communication device of claim 5, wherein the at least one selected I/Q sample is related to at least one primary synchronization signal (PSS), at least one secondary synchronization signal (SSS), at least one master information block (MIB), at least one system in block (SIB) 1, and at least one SIB 2 if the selected RAT is LTE-unlicensed.

7. The communication device of claim 5, wherein the at least one selected I/Q sample is related to at least one WiFi® beacon/Probe response if the selected RAT is WiFi®.

8. The communication device of claim 5, wherein the at least one selected I/Q sample is related to at least one advertisement data if the selected RAT is BLE.

9. The communication device of claim 1, wherein the baseband module is a baseband integrated circuit (BBIC), and
   wherein the radio frequency module is a radio frequency integrated circuit (RFIC).

10. A method for communication by a communication device, the method comprising:
    storing a plurality of in-phase/quadrature (I/Q) samples including at least one I/Q sample corresponding to each one of a plurality of radio access technologies (RATs) in a memory;
    selecting a RAT from the plurality of RATs;
    selecting at least one I/Q sample corresponding to the selected RAT, among the plurality of I/Q samples; and
    transmitting at least one message using the at least one selected I/Q sample and the selected RAT.

11. The method of claim 10, wherein an RF module in the communication device comprises a single transceiver.

12. The method of claim 10, wherein the at least one I/Q sample is provided from a configuration device.

13. The method of claim 10, wherein the communication device selects the RAT based on at least one of a user configuration, automatic detection, and geographic location (geo-location).

14. The method of claim 10, wherein the plurality of RATs includes WiFi®, cellular, Bluetooth®, or Bluetooth® low energy (BLE), LTE-unlicensed (LTE-U).

15. The method of claim 14, wherein the at least one selected I/Q sample is related to at least one primary synchronization signal (PSS), at least one secondary synchronization signal (SSS), at least one master information block (MIB), at least one system in block (SIB) 1, and at least one SIB 2 if the selected RAT is LTE-unlicensed.

16. The method of claim 14, wherein the at least one selected I/Q sample is related to at least one WiFi® beacon/Probe response if the selected RAT is WiFi®.

17. The method of claim 14, wherein the at least one selected I/Q sample is related to at least one advertisement data if the selected RAT is BLE.

18. A method for configuring in a communication device, the method comprising:
    initiating a configuration mode;
    receiving information, wherein the information includes at least one of an identifier (ID) for a tag and at least one in-phase/quadrature (I/Q) sample;
    performing correlation between the received information and stored information including a plurality of in-phase/quadrature (I/Q) samples corresponding to a plurality of radio access technologies (RATs), respectively;
    storing the received information if the correlation is successful;
    transmitting a beacon signal using one of the RATs, wherein the one RAT corresponds to the at least one I/Q sample; and
    exiting the configuration mode if an indication is received, wherein the indication indicates that a verification is completed.

19. The method of claim 18,
    wherein the one RAT includes one of WiFi®, cellular, Bluetooth®, or Bluetooth® low energy (BLE), LTE-unlicensed (LTE-U),
    wherein the at least one I/Q sample is related to at least one primary synchronization signal (PSS), at least one secondary synchronization signal (SSS), at least one master information block (MIB), at least one system in block (SIB) 1, and at least one SIB 2 if the one RAT is LTE-unlicensed, wherein the at least one I/Q sample is related to at least one WiFi beacon/Probe response if the one RAT is WiFi, and wherein the at least one I/Q sample is related to at least one advertisement data if the one RAT is BLE.

20. The method of claim 18, wherein the beacon signal is transmitted for a pre-defined period of time.

* * * * *